United States Patent [19]
Graebner

[11] Patent Number: 6,052,497
[45] Date of Patent: Apr. 18, 2000

[54] SYSTEM COMPRISING ACOUSTO-OPTIC TUNABLE FILTER

[75] Inventor: John Edwin Graebner, Short Hills, N.J.

[73] Assignee: Lucent Technologies Inc., Murray Hill, N.J.

[21] Appl. No.: 09/083,415

[22] Filed: May 22, 1998

[51] Int. Cl.⁷ .................................................. G02F 1/335
[52] U.S. Cl. ..................... 385/7; 385/1; 385/11
[58] Field of Search ...................... 385/7, 1–11

[56] References Cited

U.S. PATENT DOCUMENTS

| | | | |
|---|---|---|---|
| 3,822,929 | 7/1974 | Heidrich et al. | 350/161 |
| 3,982,817 | 9/1976 | Feichtner | 350/149 |
| 4,533,207 | 8/1985 | Alferness | 385/7 |
| 4,565,983 | 1/1986 | Gratze | 333/193 |
| 5,002,349 | 3/1991 | Cheung et al. | 350/96.13 |
| 5,384,799 | 1/1995 | Osterwalder | 372/32 |
| 5,400,171 | 3/1995 | Song | 385/7 |
| 5,448,665 | 9/1995 | Kershaw et al. | 385/30 |
| 5,611,004 | 3/1997 | Chang et al. | 385/11 |
| 5,652,809 | 7/1997 | Aronson | 385/7 |

OTHER PUBLICATIONS

"Characteristics of Metal–Diffused LiNbO₃ for Acoustic Devices", by Boyd, G.D. et al., *Journal of Applied Physics*, vol. 48, No. 7, pp. 2880–2881 (Jul. 1977).

"Polarization–Independent Acoustically Tunable Optical Filter", by Smith, D.A. et al, *Appl. Phys. Lett.*, 56(3), pp. 209–211, (Jan. 15, 1990).

"Toward the Ideal Codirectional Bragg Filter with an Acousto–Optic–Filter Design", by Song, G. H., *Journ. of Lightwave Techn.*, vol. 13, No. 3, pp. 470–480 (Mar. 1995).

"Sidelobe Suppression in an Acousto–Optic Filter with a Raised–Cosine Interaction Strength", by Smith, D. A. et al, *Appl. Phys. Lett.*, 61(9), pp. 1025–1027 (Aug. 31, 1992).

"Tunable Acoustoopic Reflection Filters in LiNbO₃ without a Doppler Shift", by Boyd, G. D. et al, *Journ. of Lightwave Technology Technology*, vol. 7, No. 4, pp. 625–631 (Apr. 1989).

"High–Performance Acousto–Optic Guided–Light–Beam Device Using Two Tilting Surface Acoustic Waves", by Tsai, C. S. et al., *Applied Physics Letters*, vol. 26, No. 4, pp. 140–142 (Feb. 15, 1975).

"Integrated Optics N x N Multiplexer on Silicon", by Dragone, C. et al., *IEEE Photonics Tech. Lett.*, vol. 3, No. 10, pp. 896–899 (Oct. 1991).

(List continued on next page.)

*Primary Examiner*—Phan T. H. Palmer
*Attorney, Agent, or Firm*—Scott J. Rittman

[57] ABSTRACT

A system, e.g., a wavelength division multiplexed optical network, having a tunable add/drop filter is provided. The filter of the invention contains a substrate having a waveguide capable of guiding both optical waves and acoustic waves. An interdigital transducer induces one or more acoustic waves of desired wavelengths in the waveguide, along the same direction as the optical waves, such that one or more desired optical wavelength channels are reversed in direction, i.e., reflected back in the direction from which the light entered the waveguide. The filter of the invention thus provides reversal of direction of selected optical wavelengths in a manner similar to that of a fiber grating, but, unlike a fiber grating, the filter of the invention is also capable of being tuned in real-time to reflect light of selected wavelength bands, by adjusting the frequency of the voltage applied to the interdigital transducer.

14 Claims, 2 Drawing Sheets

OTHER PUBLICATIONS

"Elastic Waves in Solids", by Dieulesaint, E., published by John Wiley & Sons, pp. 401.

"Systematic Study of Acoustic Surface Modes and Their Acousto–Optic Coupling in LiNbO$_3$ and LitaO$_3$", by Flory, C. A. et al., *IEEE 1990 Ultrasonics Symposium*, vol. 2, pp. 631–636, Honolulu, HI (Dec. 4–7, 1990).

"Surface–Acoustic–Wave Directional Coupler for Apodization of Integrated Acousto–Optic Filters", by Smith, D. A. et al., *IEEE Trans. on Ultrasonics, Ferroelectrics, and Frequency Control*, vol. 40, No. 1, pp. 22–25 (Jan. 1993).

"Low–Sidelobe Weighted–Coupled Integrated Acoustooptic Tunable Filter Using Focused Surface Acoustic Waves", by Kar–Roy, A., *IEEE Photonics Technology Lett.*, vol. 4, No. 10, pp. 1132–1135 (Oct. 1992).

"Erbium–Doped Lithium Niobate Waveguide Devices", by Sohler, W., *IEEE Lasers and Electro–Optics Society*, 1995 Annual Meeting, Conf. Proc., vol. 2, pp. 283–284, (Oct. 30–Nov. 2, 1995).

"Low–Loss SAW Dispersive Filters with Low Sidelobe Level in Compressed Signal", by Kawalec, A. M., *Opto–Electronics Review*, pp. 34–37 (Feb. 1994).

"Acoustic Surface Wave Velocity Perturbations in LiNbO$_3$ by Diffusion of metals", by Schmidt, R. V., *Appl. Phys. Lett.*, vol. 27, No. 1, pp. 8–10 (Jul. 1, 1975).

Low–Loss Single–Mode Optical Waveguides and Efficient High–Speed Modulators of LiNb$_x$Ta$_{1-x}$O$_3$ on LiTaO$_3$, by Hammer, J.M. et al., *Appl. Physics Lett.*, vol. 24, No. 11, pp. 545–547 (Jun. 1, 1974).

"LiNbO$_3$ Acousto–Optic Tunable Filter Module with Built–In Temperature Control Function", by Nakaya, K. et al., 1997 *Electronic Information Communications Society General Meeting*, pp. 1–5.

"Acousto–Optic Tunable Filter Using Focused Surface Acoustic Waves on X–Cut LiNbO$_3$ with Correction of Biased Propagation", by Hosoi, T., et al., 1997 *Electronic Information Communications Soc. General Meeting*, pp. 6–11.

"Metal–Diffused Optical Waveguides in LiNbO$_3$", by Schmidt, R. V., *Appl. Phys. Lett.*, vol. 25, No. 8, pp. 458–460 (Oct. 15, 1974).

"Fabrication of Optical Waveguiding Layer in LiTaO$_3$ by Cu Diffusion", by Noda, J. et al., *Appl. Phys. Lett.*, vol. 25, No. 5 pp. 308–310 (Sep. 1, 1974).

"Optical Networking", by Al–Salameh, D. Y. et al., *Bell Labs Technical Journal*, vol. 3, No. 1 pp. 39–61 (Jan.–Mar. 1988).

"Surface Acoustic Wave Filters", by Rosenberg, R. L., *Miniaturized and Integrated Filters*, Edited by Mitra, S, K. and Kurth, C. F., Published by John Wiley & Sons, pp. 329–373.

SYSTEM COMPRISING ACOUSTO-OPTIC TUNABLE FILTER

BACKGROUND OF THE INVENTION

1. Field of the Invention

The invention relates to tunable filters for optical networks.

2. Discussion of the Related Art

An important element of wavelength-division-multiplexed (WDM) optical networks is a wavelength-selective optical switch, commonly referred to as an add/drop filter. (WDM systems are discussed, for example, in D. Al-Salameh et al., "Optical Networking," *Bell Labs Technical Journal*, Vol. 3, No. 1, January-March 1998, at 39, the disclosure of which is hereby incorporated by reference.) The add/drop filter allows addition or removal of a selected wavelength to or from the multiple-wavelength WDM signal in an optical fiber. Currently, two types of add/drop filters are used commercially—integrated lithium niobate filters and fiber gratings. The integrated lithium niobate filter typically uses (a) a Dragone arrayed-wavelength-grating (AWG) (as shown in FIG. 4 of Salameh et al., supra) to separate the input channels, i.e., individual wavelength spectra separated by a wavelength spacing, from the WDM signal into individual fibers, (b) lithium niobate electro-optic switches on individual fibers to perform add/drop on each channel, and (c) another Dragone AWG to recombine the wavelengths into a WDM signal on a single fiber. (See, e.g., C. Dragone et al., *IEEE Photonic Technology Letters*, Vol. 3, 1991, at 896.) This apparatus provides useful results, but is relatively costly and occupies an undesirably large amount of space.

Fiber gratings are permanent, periodic variations in a fiber's index of refraction that are introduced during manufacture. (See, e.g., T. Erdogan and V. Mizrahi, *IEEE LEOS Newsletter*, February 1993, at 14.) Particular wavelength regions of light traveling along the fiber are reversed in direction by the grating (the light is reflected back in the direction from which the light originated) if the well-known Bragg conditions for reflection are met, i.e., where the optical wavelength is equal to twice the grating period. This reversal of direction is desirable due to its relative simplicity: (a) the light either passes through the grating (for wavelengths where the Bragg condition is not met) or is reversed (for wavelengths where the Bragg condition is met), and (b) the input signals and output signals are, respectively, kept together for further distribution. Unfortunately, fiber gratings generally are not able to be reconfigured in real-time.

Efforts to improve on integrated lithium niobate filters and fiber gratings have involved filters which utilize acoustics to provide real-time tunability to select desired wavelength channels. For example, as discussed in C. Tsai et al., *Appl. Phys. Lett.*, Vol. 26, 1975, at 140, and reflected in FIG. 1, it is possible to use a surface acoustic wave (SAW) to interact with the optical beam in a planar optical wave guide 10 located on a lithium niobate substrate 12. The SAW is generated by a high frequency voltage applied to the interdigital SAW transducer 14 (IDT) (partially shown) located on the waveguide 12. (Transducers useful in SAW devices are discussed, for example, in R. Rosenberg, "Surface Acoustic Wave Filters," in *Miniaturized and Integrated Filters*, 329 (S. Mitra and C. Kurth, eds., 1989), the disclosure of which is hereby incorporated by reference.) Non-normal input optical beam 16 having wavevector $k(op)^{in}$ enters the waveguide at an angle θ with respect to an acoustic wave 18 having wavevector $k(ac)$. The beam 16 is reflected as light 17 having a wavevector $k(op)^{out}$ if the acoustic and optical wavevectors satisfy the well-known Bragg conditions for reflection. ("Op" indicates optical wave and "ac" indicates acoustic wave.) Input optical waves at other wavelengths will pass through the optical waveguide 10 as unscattered light 19. Unfortunately, the lateral spreading of the acoustic wave and the non-normal incidence of the input beam 16 is undesirable in some circumstances. In addition, because the optical input is at an angle θ≠0, birefringence of the incident ray will generally occur, although it is possible to reduce the detrimental effect of such birefringence by polarizing the input beam.

Another approach utilizing acoustic waves is the mode-conversion acousto-optic tunable filter (AOTF), as discussed, for example, in U.S. Pat. No. 5,652,809 to Aronson and U.S. Pat. No. 5,611,004 to Chang et al., the disclosures of which are hereby incorporated by reference. As shown in FIG. 2, a mode-conversion AOTF is fabricated in an elongated crystalline piezoelectric substrate 20. The substrate 20 is typically lithium niobate, oriented (as shown in FIG. 2) with its x-z plane perpendicular to the direction of the input light to provide a desired propagation of the input light. An optical waveguide 22 is formed on an upper surface of the substrate 20, typically by interdiffusion of titanium. Input light 24, which is passed through a polarizer 26 to provide a single polarization mode, propagates through the waveguide 22, and an acoustic wave is introduced by applying an electrical signal to an interdigital transducer 28. The acoustic wave induces a refractive index grating, such that the transverse electric (TE) and transverse magnetic (TM) polarization modes are coupled for a particular band of optical wavelengths, and within this particular band, light is converted to a polarization mode orthogonal to its previous polarization mode. An output polarizer 30, at a right angle to the input polarizer, thus blocks all but these selected optical wavelengths. Such mode-conversion AOTFs offer useful results, but the unselected wavelengths are lost unless a polarizing beam-splitter is used. In addition, the acoustic waves are not maintained in the optical waveguide, and thus lose their effectiveness as they propagate through the material. Moreover, the frequency response of mode-conversion AOTFs is often unacceptable due to the inclusion of large sidelobes in the frequency response. Sidelobes are peaks in the response at frequencies falling outside the selected optical wavelength channels, and tend to result in the selection of a portion of undesired wavelength channels. Such sidelobes thereby detrimentally affect the usefulness and precision of mode-conversion AOTFs.

Thus, while useful tunable add/drop filters have been developed, filters offering improved properties are desired.

SUMMARY OF THE INVENTION

The invention provides a system containing a tunable add/drop filter offering desirable properties in several respects. Specifically, as reflected in FIG. 3, the filter of the invention contains a substrate 40 in which or on which is formed a waveguide 42 capable of guiding both optical waves and acoustic waves. (As used herein, waveguide refers to a material in which the waves are guided, with the waveguide acting as a core and the surrounding material acting as a cladding to maintain the waves within the core. Optical waves indicate wavelengths ranging from about 0.2 μm to about 20 μm, with typical wavelengths ranging from 1 μm to 2 μm.) The waveguide material (and typically the entire substrate) is piezoelectric (meaning that an electric voltage is capable of inducing stress in the material, such as exhibited in $LiNbO_3$, $LiTaO_3$, ZnO, and InSb). Voltage applied to an interdigital transducer (IDT) 44 (partially shown) induces one or more acoustic waves 45 of desired wavelengths in the waveguide, due to the piezoelectric nature of the waveguide material, such that substantially all the light in one or more desired optical wavelength channels is reversed in direction, i.e., reflected back in the direction from which the light 46 entered the waveguide, due to Bragg reflection. (Bragg reflection indicates that reflection takes place when the relationship $\lambda_{acoustic} = \lambda_{optical}/2n$ is met for a particular wavelength, where n is the index of refraction in the waveguide for that wavelength and $\lambda_{optical}$ is the optical wavelength in vacuum.) The filter of the invention thus provides reversal in direction of selected optical wavelengths in a manner similar to that of a fiber grating. However, unlike a fiber grating, the filter of the invention is also capable of being tuned in real-time to reflect light of selected wavelength bands, by adjusting the frequency of the voltage applied to the IDT. In addition, as with fiber gratings, non-selected channels 48 pass through the filter of the invention substantially unchanged. Moreover, the filter of the invention is polarization independent, unlike a mode-conversion AOTF.

Typically, the substrate of the filter is lithium niobate (a piezoelectric material) oriented such that the input light propagates in the z-direction (as illustrated in FIG. 3). This orientation reduces birefringence because both the transverse electric and the transverse magnetic polarization modes of optical waves have the same velocity in the z-direction. The waveguide is typically formed by interdiffusing a relatively narrow strip of zinc (e.g., about 1 to about 20 μm across and about 1 to about 20 μm deep) into the surface of the lithium niobate. Zinc is desirable because the velocity of both optical waves and acoustic waves is decreased in zinc-doped lithium niobate, relative to undoped lithium niobate. The zinc doping thereby substantially maintains both types of waves within the waveguide.

DETAILED DESCRIPTION OF THE INVENTION

Figure 1:
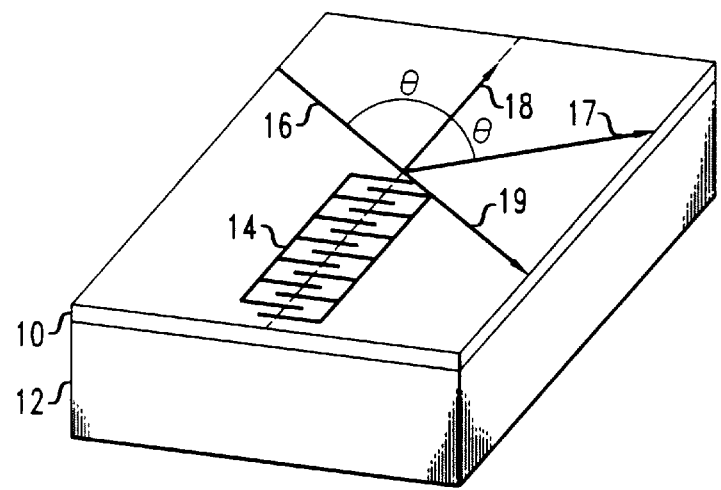
FIGS. 1 and 2 illustrate previous acousto-optic filters.
Figure 2:
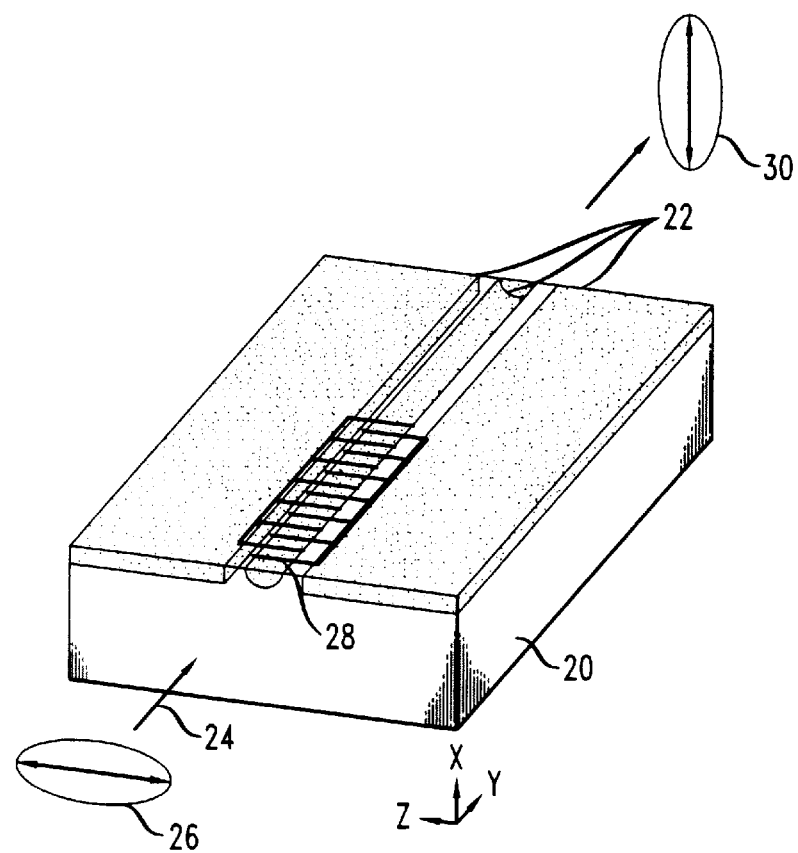
Figure 3:
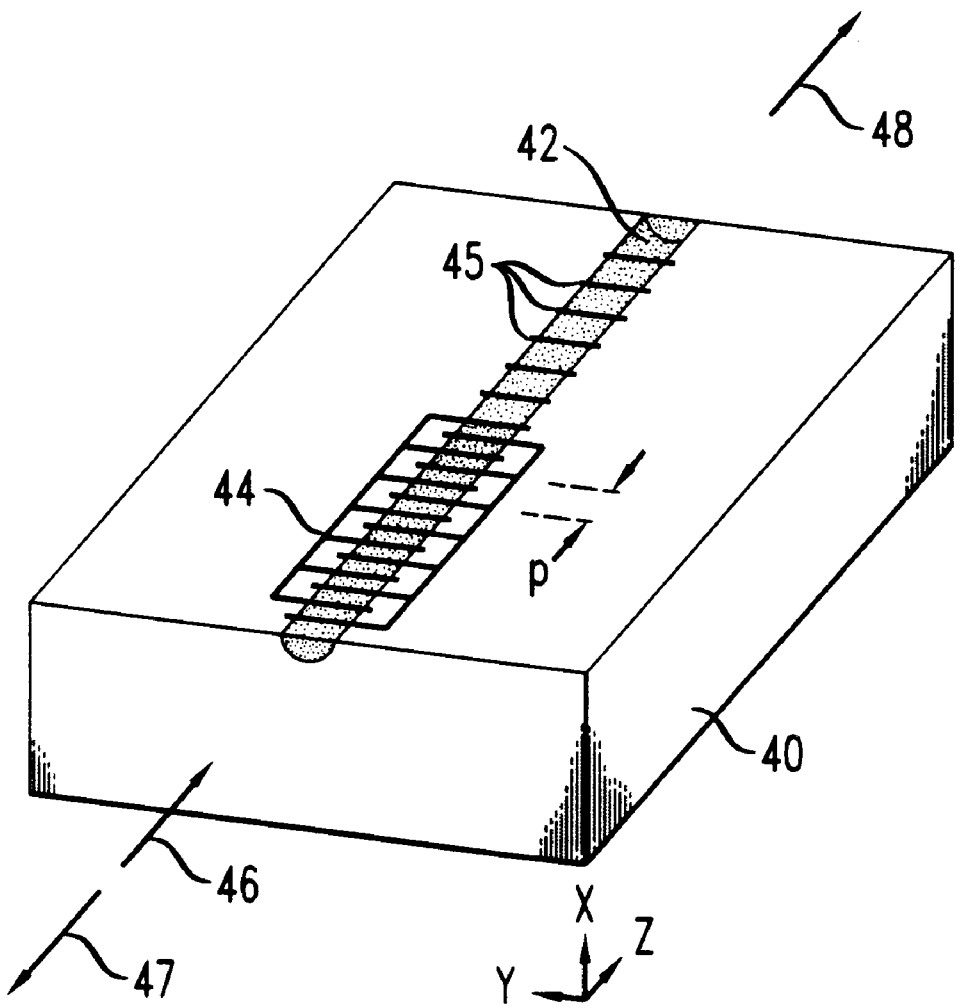
FIG. 3 illustrates an embodiment of a tunable acousto-optic filter of the invention.

FIG. 3 illustrates an embodiment of the tunable, acousto-optic, add/drop filter of the invention. This embodiment of the filter contains a piezoelectric substrate 40 in which is formed a waveguide 42 (of piezoelectric material). (It is also possible to use a non-piezoelectric substrate, where at least the waveguide is piezoelectric.) The waveguide 42 is capable of guiding both optical waves and acoustic waves (meaning that the velocities of optical and acoustic waves in the waveguide 42 are slower than the velocities of optical and acoustic waves in the surrounding material, which acts as a cladding). An interdigital transducer (IDT) is typically formed to provide one or more acoustic waves 45 of desired (or close to desired) wavelengths in the waveguide. IDTs are known in the art, as reflected in R. Rosenberg, "Miniaturized and Integrated Filters," supra, and contain conductive wiring, e.g., aluminum, that induces stress in a piezoelectric material upon application of an ac voltage, the stress creating one or more acoustic waves. In one embodiment, schematically shown in FIG. 3, an IDT 44 contains interlaced, roughly U-shaped fingers of a conductive metal. Upon providing the IDT 44 with a voltage from an outside source, the interlaced fingers produce one or more acoustic waves 45 along the waveguide 42. The acoustic wave is generally of a wavelength approximately equal to the period P between adjacent finger lines (the operation of the IDT in the invention is discussed in more detail below). Other methods for inducing an acoustic wave in the waveguide 42 are also possible.

Typically, the substrate is lithium niobate oriented such that the input light 46 propagates in the z-direction (as illustrated in FIG. 3), which reduces birefringence because both the transverse electric and the transverse magnetic polarization modes of optical waves have the same velocity in the z-direction. With such a lithium niobate substrate, the waveguide is typically formed by interdiffusing zinc (generally in a strip about 1 to about 20 μm across and about 1 to about 20 μm deep at its deepest point from the substrate's surface) into the lithium niobate, depending on the particular application and size of the system. Typical zinc dopant concentrations in the waveguide range from about $10^{20}$ to about $10^{22}$ atoms/cm$^3$. Zinc decreases the velocity of both optical waves and acoustic waves in the lithium niobate (relative to the surrounding undoped lithium niobate), thereby substantially maintaining both types of waves within the waveguide, i.e., the undoped lithium niobate outside the waveguide acts as a cladding for the propagating optical and acoustic waves. The optical waves and acoustic waves therefore propagate in substantially the same direction, which is advantageous in that the resulting overlap between the two wave types improves the accuracy of the desired Bragg reflection. Other materials typically diffused into lithium niobate to form an optical waveguide, e.g., titanium, molybdenum, nickel, and copper, tend to decrease optical velocity but increase acoustic velocity, relative to undoped lithium niobate, and therefore fail to provide a waveguide for acoustic waves.

Reversal in direction of a selected optical wavelength channel indicates that at least about 99% of the light in that channel is Bragg reflected back in the direction from which the light originated. To accomplish such reversal in direction in this lithium niobate embodiment, the wavevector of the incident optical wave 46 is reversed, requiring:

$$k(ac) = 2nk(op)^{in} \tag{1}$$

where k(ac) is the acoustic wavevector in the lithium niobate, $k(op)^{in}$ is the wavevector of incident optical wave, and n is the refractive index in the lithium niobate for the particular optical wavelength of interest. For the optical wavelength typically of interest in WDM systems, 1.55 μm, the refractive index in lithium niobate is 2.2. Thus, with $k = 2\pi/\lambda$ (a known relationship), Eq. (1) above becomes $$\lambda_{ac} = \lambda_{op}/2n = \lambda_{op}/4.4 \tag{2}$$

($\lambda_{op}$ is the optical wavelength in vacuum.)

These relationships are used to calculate the appropriate parameters for optical wavelengths of interest. For example, for an optical wavelength of 1.55 μm, an acoustic wave of about 0.35 μm is desired. Thus, an IDT having a period, P, of about 0.35 μm is desired. The fundamental frequency, $f_o$, for driving the IDT to create this acoustic wave is determined according to the relationship $f_o = v(ac)/P$, where v(ac) is the acoustic velocity. For lithium niobate, v(ac) is 3400 m/s (along the z-direction), and thus the fundamental frequency for a P of about 0.35 μm is about 10 GHz. Parameters for other optical wavelengths are similarly calculated.

The filter of the invention is tuned by providing the IDT with one or more frequencies other than, or in addition to, the fundamental frequency. Specifically, as known in the art, frequencies in a range around the fundamental frequency will create acoustic waves of varying wavelength, and such varying acoustic waves will therefore result in Bragg reflection of differing optical channels. The particular optical channels desired are therefore capable of being selected based on the frequency provided to the IDT. In addition, as also known in the art and discussed in R. Rosenberg, "Miniaturized and Integrated Filters," supra, the number of interlaced fingers of the IDT affects the range over which varying frequencies will produce an acoustic wave strong enough to provide such reflection.

It is expected that for this lithium niobate embodiment of the invention, the acoustic power needed to provide the Bragg reflection in the relatively narrow waveguide would be about 1 to about 3 mW/channel, an approximately 10× reduction from a mode-conversion AOTF due to the smaller volume of the waveguide in the invention. Currently, a desired spacing between optical wavelength channels is about 200 GHz, which requires a relatively narrow bandwidth of about 0.05%. For such a spacing, the contemplated length of the filter is 2000×$\lambda_{acoustic}$ (about 700 $\mu$m for an acoustic wave of 0.35 $\mu$m), since about 2000 cycles of the Bragg grating are expected to be necessary to achieve such a bandwidth. Based on this device length, the time to change the selected wavelength channels (i.e., the time for an acoustic wave to go the length of the device) is expected to be desirably short, e.g., about 0.2 $\mu$s.

For a period, P, of 0.35 $\mu$m, the linewidth of each of the interlaced fingers of the IDT will be about 0.09 $\mu$m. To allow use of a thicker linewidth, it is possible to induce a frequency equal to an odd harmonic of the fundamental frequency, $f_o$. For example, a period of 3×0.35 $\mu$m, equal to 1.05 $\mu$m, allows for a thicker linewidth of about 0.25 $\mu$m, and the IDT would then be driven at its third harmonic, 3×$f_o$, i.e., 3×3.3 GHz (10 GHz). In addition, the IDT is advantageously located toward one end of the waveguide (e.g., flush with the end of the waveguide at which input light enters the waveguide). This placement reduces or prevents undesirable consequences caused by the Doppler effect. Specifically, the IDT generates acoustic waves traveling in both directions along the waveguide, and these two groups of waves will reflect light of slightly different wavelength. While this effect is relatively small, such interactions have the potential to reduce the reliability and precision of the filter.

To reduce the fundamental frequency, a material with a smaller v(ac) would be useful. For example, it is contemplated that cadmium sulfide, which has a v(ac) approximately half that of lithium niobate, would be a useful material. Use of CdS would reduce the fundamental frequency to about 4.4 GHz. It is also contemplated to form a waveguide on silicon by depositing a waveguide of piezoelectric material directly onto a silicon wafer. The waveguide would typically be single-crystalline or at least highly oriented (highly-oriented indicating a polycrystalline material in which a predominant number of crystals have a similar orientation), advantageously with its optic axis parallel to the axis of the waveguide. In addition, for the waveguide material to act as a waveguide for both optical and acoustic waveguides, the velocities of optical and acoustic waves in the material would typically be less than the velocities in the surrounding silicon. Such a filter would be desirable due to relatively easy integration with other devices on silicon.

The filter of the invention is useful in optical fiber networks, particularly WDM systems.

Other embodiments of the invention will be apparent to those skilled in the art from consideration of the specification and practice of the invention disclosed herein.

What is claimed is:

1. A system comprising a tunable add/drop filter, the filter comprising:

a substrate;

a waveguide located on or within the substrate, the waveguide capable of guiding both optical waves and acoustic waves; and an interdigital transducer, wherein the transducer is capable of inducing acoustic waves in the waveguide that provide reversal of direction of at least a portion of optical waves propagating through the waveguide.

2. The system of claim 1, wherein the substrate is lithium niobate.

3. The system of claim 2, wherein the waveguide is formed such that the optical waves and acoustic waves propagate along the z-direction of the lithium niobate.

4. The system of claim 2, wherein the waveguide is formed by interdiffusing zinc into the lithium niobate.

5. The system of claim 4, wherein the waveguide is about 1 $\mu$m to about 20 $\mu$m wide and about 1 $\mu$m to about 20 $\mu$m deep at its deepest point from the surface of the substrate.

6. The system of claim 2, wherein the fingers of the interdigital transducer are less than 0.09 $\mu$m wide, and the interdigital transducer has a period, P, of about 0.35 $\mu$m.

7. The system of claim 1, wherein the waveguide is formed from a material in which the velocities of the optical waves and the acoustic waves are lower than the velocities of the optical waves and the acoustic waves in the surrounding material.

8. The system of claim 1, wherein the interdigital transducer is capable of inducing acoustic waves of varying wavelength such that selected optical wavelength channels are reversed in direction.

9. The system of claim 1, wherein the system is a wavelength division multiplexed optical network.

10. A process for selecting particular optical wavelengths in an optical network, comprising the steps of:

directing optical waves into a waveguide, the waveguide capable of guiding both optical waves and acoustic waves; and inducing at least one acoustic wave in the waveguide, the at least one acoustic wave propagating in substantially the same direction as the optical waves, such that optical waves are reversed in direction when $\lambda_{acoustic}=\lambda_{optical}/2n$, where $\lambda_{acoustic}$ is the acoustic wavelength, $\lambda_{optical}$ is the optical wavelength in vacuum, and n is the refractive index in the waveguide material.

11. The process of claim 10, wherein the waveguide is formed by interdiffusing zinc into a lithium niobate substrate.

12. The process of claim 11, wherein the waveguide is formed such that the optical waves and acoustic waves propagate along the z-direction of the lithium niobate.

13. The process of claim 12, wherein the acoustic wave is induced by an interdigital transducer, and wherein the fingers of the interdigital transducer are less than 0.09 $\mu$m wide, and the interdigital transducer has a period, P, of about 0.35 $\mu$m.

14. The process of claim 10, wherein the waveguide is formed from a material in which the velocities of the optical waves and the acoustic waves are lower than the velocities of the optical waves and the acoustic waves in the surrounding material.

* * * * *